No. 623,034. Patented Apr. 11, 1899.
T. J. REID.
RUBBER TIRED WHEEL.
(Application filed Feb. 3, 1898.)
(No Model.)

Witnesses
Harry L. Marsh
Inventor
Thomas J. Reid,
By his Attorneys
Finckel & Finckel,

UNITED STATES PATENT OFFICE.

THOMAS J. REID, OF COLUMBUS, OHIO.

RUBBER-TIRED WHEEL.

SPECIFICATION forming part of Letters Patent No. 623,034, dated April 11, 1899.

Application filed February 3, 1898. Serial No. 668,966. (No model.)

*To all whom it may concern:*

Be it known that I, THOMAS J. REID, a citizen of the United States, residing at Columbus, in the county of Franklin and State of Ohio, have invented a certain new and useful Improvement in Rubber-Tired Wheels, of which the following is a specification.

My invention relates more particularly to wheels tired with solid-rubber tires as contradistinguished from hollow inflatable tires.

The only tires of the solid sort that at the present time have gained any considerable public approval are those having one or more concealed retaining-wires passed through openings in the body of the tire; but these have not given complete satisfaction because the openings render the tire fragile and weak in places where it should be solid and strong, and, moreover, the wires soon cut the rubber, allowing the tire to creep, be broken, or dislodged from its seat in the rim.

The object of my invention is to provide an improved tired wheel in which a solid tire without perforations or openings of any kind is secured by retaining-bands fitting against and engaging the sides of the tire, said bands being of such form on their outer faces that in conjunction with the walls of the channel between which the bands and tire are wedged the rubber of the tire within the walls is condensed and held in its condensed condition between said bands.

Figure 1:
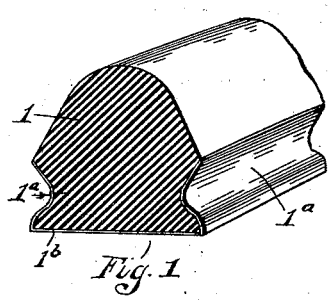
Figure 4:
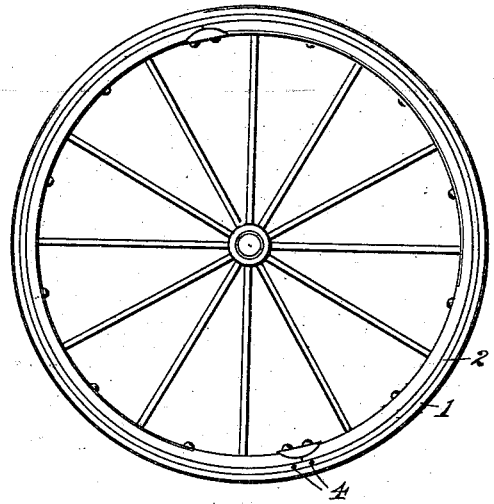
Figures 2, 6:
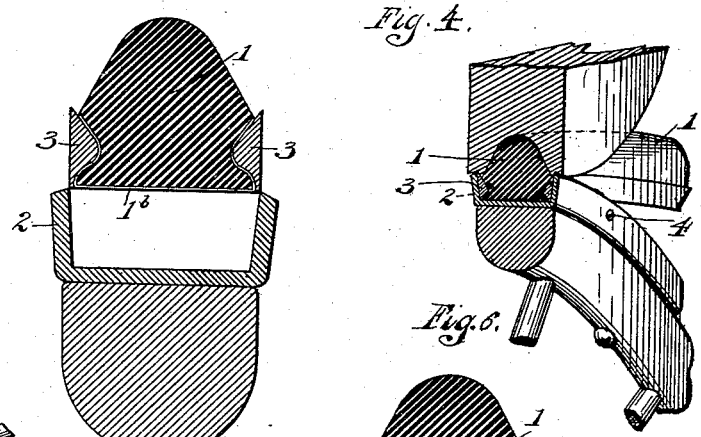
Figure 3:
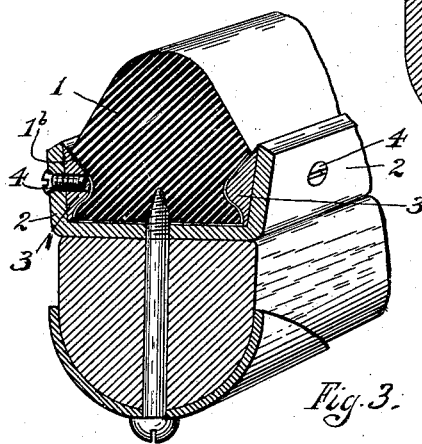
Figure 5:
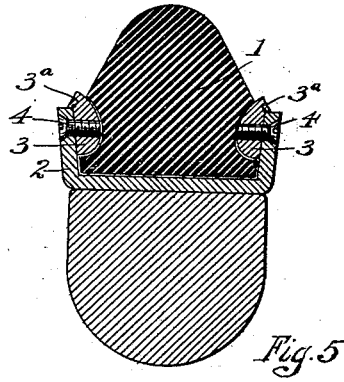

In the annexed drawings, Figure 1 illustrates in perspective view a small fraction of a form of tire employed by me. Fig. 2 is a cross-sectional view of the tire with the retaining bands or rings in position about to be pressed into the metallic channel on the wooden rim. Fig. 3 illustrates in perspective view, the ends being in section, a fraction of a tire and rim, the tire having been pressed into its place. Fig. 4 is a view in side elevation of a complete wheel having my improvements. Fig. 5 is a sectional view of a tire in place, showing another form of retaining-ring. Fig. 6 illustrates the manner of putting the tire into the channeled rim.

Like characters of reference in the different views designate corresponding parts.

The strip of rubber 1, constituting the tire proper, is preferably of such length as to extend entirely around the channel-rim 2, shrunk on an ordinary wooden wheel. In cross-section the outer portion of the tire or that part which projects beyond the entire peripheries of the retaining-bands has inclined converging sides terminating in a rounded tread, as usual, and the inner portion or that portion which lies within the outer peripheries of the channel or between the retaining-bands is made of greater width at its inner face than the bottom of the said channel and is shown to be in its general outline rectangular—that is, with its vertical sides lying in parallel planes; but these sides have reëntrant grooves or depressions $1^a$ to receive the inner sides of the retaining-bands 3. The retaining-bands 3 conform in shape at their inner sides to the form of the grooves in the tire; but their outer sides are flat, and when the bands are in place in the unseated tire their outer faces are parallel to each other and perpendicular to the inner face of the tire. The metallic channel 2 has outwardly inclined or divergent side walls that are flat on their inner sides, and the distance between the outer peripheries of the walls is made just sufficient to permit slight insertion of the tire, with its retaining-bands, and so that some pressure shall be required to force the tire to its seat at the bottom of the channel. The purpose of this construction is to insure the lateral compression of the rubber and retention of the rubber in its compressed condition between the retaining-bands, and the fact that the outer sides of the retaining-bands and the inner sides of the channel are smooth metal permits the comparatively easy wedging of the retaining-bands, along with the tire, into the channel. In Figs. 3 and 4 I have indicated how the rubber is compressed by making heavier the section-lines at the base of the tire.

Any approved device for forcing the tire and retaining-bands into the channel may be employed; but at present I contemplate using a roller having peripheral grooves to receive the outer portion of the tire and the outer projecting edges of the retaining-bands, said roller being journaled in a revoluble frame or lever having its fulcrum in the hub of the wheel to be tired. This, however, constitutes no part of my present invention.

The retaining-band may consist of a single piece in the form of a split ring, or it may be composed of sections and fastened, when pressed into place, to the channel-wall by means of small screws 4, passing laterally through the walls of the channel.

When the wheel is running, there will of course be more or less vertical vibration of the tire due to the compressing thereof under the weight of the load, and to relieve the screw-fastenings referred to of the thrust incident to this compression I make the band of such size or form that it shall have a bearing upon the metallic channel. In Figs. 2 and 3 I have shown one such form in which the band is of sufficient depth to come into contact with the bottom of the channel when the tire has been pressed home and in Fig. 5 another form in which the outer edge of the ring is made with a laterally-extending shoulder $3^a$ to rest upon the inner corners of the peripheries of the channel. In either case, it will be observed, the thrust upon the retaining-band due to the compression of the tire is borne by the channel-iron and not by the retaining-screws 4.

In addition to the means already described for holding the tire in the channel I may employ screws 6, passed through clip-plates placed over adjoining felly ends, said screws extending through the felly and threaded in the bottom of the metallic channel and entering and engaging the base of the tire, as clearly indicated in Fig. 3.

From the foregoing it will be observed that in putting the tire, with the retaining-bands, into the channel I have metal sliding or moving against metal, making the process of applying the tire immensely less difficult than where the rubber is wedged in against metal. This method of applying renders it possible to attain the extreme condensation of rubber desired at the points when it is held by the retaining-bands, and, further, the continued retention of the condensation or upset of rubber at the base of the tire is insured.

What I claim, and desire to secure by Letters Patent, is—

1. A wheel having a metallic tire-channel with straight outwardly-inclined inner sides, and a solid-rubber tire, the cross-section of the inner face of which is of greater width than that of the bottom of said channel, and metallic tire-retaining bands having their inner sides adapted to engage and hold said tire and their outer sides flat, the said retaining-bands fitting against the opposite sides of said tire and being wedged into said channel, whereby the tire is dovetailed and held between said bands, and means for holding said bands in place, substantially as described.

2. A wheel having a metallic tire-channel with straight outwardly-inclined inner sides, and a solid-rubber tire the cross-section of the inner face of which is of greater width than that of the bottom of said channel, and metallic tire-retaining bands having their inner sides adapted to engage and hold said tire, their outer sides flat, and supplemental bearings against the said channel, the said retaining-bands fitting against the opposite sides of said tire and being wedged into said channel whereby the tire is dovetailed and held between said bands, and devices 4 for holding said bands in place, substantially as described.

THOMAS J. REID.

In presence of—
  A. L. PHELPS,
  EDWARD M. TAYLOR.